United States Patent
Lauer et al.

(10) Patent No.: US 7,331,220 B2
(45) Date of Patent: Feb. 19, 2008

(54) DEVICE AND METHOD FOR MONITORING TYRE PRESSURES

(75) Inventors: Peter Lauer, Bad Vilbel (DE); Stefan Stölzl, Weinheim (DE); Martin Griesser, Eschborn (DE); Andreas Köbe, Bensheim (DE); Peter Säger, Friedrichsdorf (DE); Vladimir Koukes, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/552,750

(22) PCT Filed: Apr. 6, 2004

(86) PCT No.: PCT/EP2004/050453

§ 371 (c)(1),
(2), (4) Date: Aug. 30, 2006

(87) PCT Pub. No.: WO2004/089659

PCT Pub. Date: Oct. 21, 2004

(65) Prior Publication Data

US 2007/0000316 A1    Jan. 4, 2007

(30) Foreign Application Priority Data

Apr. 9, 2003   (DE) ................. 103 16 468

(51) Int. Cl.
*B60C 23/02*   (2006.01)

(52) U.S. Cl. ............ 73/146.3; 73/146.5; 340/445; 702/138

(58) Field of Classification Search ........... 73/146, 73/146.3, 146.5; 340/442, 447, 445; 702/138
See application file for complete search history.

(56) References Cited

U.S. PATENT DOCUMENTS

| | | | |
|---|---|---|---|
| 6,446,023 B1 * | 9/2002 | Ernst ..................... | 702/138 |
| 6,946,954 B2 * | 9/2005 | Piech et al. ............. | 340/444 |
| 2005/0000278 A1 * | 1/2005 | Haralampu et al. ...... | 73/146 |
| 2005/0258949 A1 * | 11/2005 | Iwazumi ................ | 340/442 |
| 2006/0273890 A1 * | 12/2006 | Kontogeorgakis et al. .. | 340/445 |

FOREIGN PATENT DOCUMENTS

| | | |
|---|---|---|
| DE | 10060392 | 6/2002 |
| DE | 10105641 | 8/2002 |
| DE | 10152590 | 10/2002 |
| EP | 1044829 | 10/2000 |

* cited by examiner

*Primary Examiner*—Andre J. Allen

(57) ABSTRACT

Disclosed is a tire pressure monitoring device for a motor vehicle. A tire pressure monitoring system with direct measurement includes a transmission device for transmitting tire pressure values determined by pressure sensors, and a tire pressure monitoring system with indirect measurement that operates on the basis of wheel speed sensors. The tire pressure monitoring system with direct measurement includes a tire pressure measuring device for measuring a tire pressure value only on each wheel of a driven vehicle axle and on at most one wheel of a non-driven axle. The tire pressure monitoring system with indirect measurement includes wheel speed sensors on the non-driven vehicle axle.

12 Claims, No Drawings

DEVICE AND METHOD FOR MONITORING TYRE PRESSURES

BACKGROUND OF THE INVENTION

The present invention relates to a tire pressure monitoring device and a method of monitoring tire pressure for a system including both a direct measurement tire pressure monitoring system and an indirect tire pressure monitoring system. The invention further relates to a computer program product for implementing the method.

It is of great significance for vehicle safety to reliably monitor the tire pressure on all wheels of a motor vehicle. There are different approaches how to realize tire pressure monitoring systems. So-called tire pressure monitoring systems with direct pressure measurement, as described in application DE 199 26 616 C2, exist which determine the respective pressure in the associated wheel by means of pressure sensors in the individual tires. Systems of this type monitor the tire pressure on all wheels independently, yet they are relatively expensive as they require additional devices, e.g. For transmitting and evaluating pressure sensor information. Further, so-called indirectly measuring tire pressure monitoring systems are known, e.g. From DE 100 58 140 A1, which can detect pressure loss based on auxiliary quantities, e.g. By comparing the rolling circumferences of the individual wheels.

These systems suffer from the disadvantage that a defective tire will only be detected at a significant pressure loss. Admittedly, systems of this type are inexpensive and reliable, yet they function only if pressure loss occurs on one wheel. If pressure loss occurs on several wheels at the same time, this condition will not be detected.

DE 100 60 392 A1 discloses a tire pressure monitoring device which comprises a combination of a tire pressure monitoring system with indirect measurement and a tire pressure monitoring system with direct measurement. The task of the tire pressure monitoring device described in this publication is to monitor inflation pressure loss on all four wheels by the combination of a tire pressure sensor and a tire pressure monitoring system with indirect measurement.

It is disadvantageous in this respect that when using only one tire pressure sensor, the wheels on which no tire pressure sensors are mounted can only be monitored with relatively high detection thresholds. The consequence is that inflation pressure loss is detected at a very late point of time only. It is achieved by the alternative use of two tire pressure sensors as mentioned in the above publication, with exactly one tire pressure sensor being arranged on each vehicle axle, that individual tire pressure nominal values can be determined for each axle. However, this provision does not lead to a considerably earlier detection of inflation pressure loss. As a tire pressure monitoring system with indirect measurement operates on the basis of rotational wheel speeds and, hence, is directly dependent on the wheel rolling circumference, pressure loss on the driven wheels can frequently be detected only very insufficiently or in rare moments of their free rolling.

When using a tire pressure sensor on only one wheel of the driven axle, it is only possible to detect very great pressure losses on the other driven wheel. Besides, there is still the problem that wheel slip on a driven wheel can be interpreted as pressure loss on this wheel by the tire pressure monitoring system with indirect measurement because the tire pressure monitoring system with indirect measurement does not identify whether the wheel speed increase is due to a defective tire or a slip situation. For reasons of rigidity, it is therefore possible in a tire pressure monitoring system of this type to use only high detection thresholds for pressure loss detection.

SUMMARY OF THE INVENTION

In view of the above, an object of the invention is to provide a tire pressure monitoring device and a method of monitoring the tire pressure for safely detecting, in a reliable and low-cost fashion, pressure loss on several or all tires of a motor vehicle at an early time, in consideration of the wheel slip and at a high rate of accuracy.

This object is achieved by a tire pressure monitoring device having a direct measurement tire pressure monitoring system and an indirect tire pressure monitoring system and a method of monitoring the tire pressure using the tire pressure monitoring device.

It is preferred that in a vehicle with several driven vehicle axles, the tire pressure monitoring system with direct measurement is arranged on the vehicle axle to which the maximum driving torque of the vehicle engine is applied. As a result, pressure loss on the driven axle is also detected when the driven wheels are exposed to driving torque or wheel slip, respectively, e.g. When the vehicle is accelerating. The non-driven wheels can be monitored safely by a tire pressure monitoring system with indirect measurement because the driving torque prevails on the driven axle only.

It is furthermore preferred that the wireless transmission of the tire pressure values takes place by radio transmission by means of a radio transmitter and radio receiver or by way of an optical transmission by means of transmitting diode and receiving diode. It is also preferred that there is an on-wire transmission link for transmitting the tire pressure values between the radio receiver or the receiving diode, respectively, and the evaluating unit.

The central reception antenna is preferably arranged on the vehicle in such a manner that the individual transmitter devices are allocated to the respective vehicle wheels by way of the field strength or the intensity of the transmitted signal, respectively.

In a preferred embodiment of the tire pressure monitoring device of the invention, the tire pressure monitoring system with indirect measurement, in addition to the wheel speed sensors on the non-driven vehicle axle, includes another wheel speed sensor on the driven vehicle axle or on a wheel of the driven axle. All vehicle wheels include wheel speed sensors in a particularly preferred embodiment.

In another preferred embodiment, an additional tire pressure measuring device is arranged on the non-driven vehicle axle or, in the case of all-wheel driven vehicles, on another driven vehicle axle.

It is preferred to connect a driving dynamics sensor furnishing information about the yaw rate and/or the lateral acceleration of the vehicle, to the evaluating unit in addition to the tire pressure monitoring system with indirect or direct measurement, with the result that cornering maneuvers are detected safely and quickly. This leads to a more precise and faster pressure loss detection in the tire pressure monitoring system with indirect measurement.

The learning mode is preferably started by the actuation of a reset button, e.g. In the event of changing of tires. The reset button is actuated by the operator or a mechanic.

The invention further relates to a computer program product which comprises the method of the invention.

Further features of the invention can be taken from the subsequent description by way of five embodiments.

DETAILED DESCRIPTION OF THE PREFERRED EMBODIMENTS

The tire pressure monitoring device of the invention provides two tire pressure sensors, one per wheel, on the driven axle in a first embodiment. The non-driven axle is monitored by way of wheel speed sensors already provided e.g. In a vehicle equipped with an anti-lock system (ABS). This arrangement is advantageous because pressure loss on a driven wheel is safely detected. Due to driving of a wheel (e.g. during acceleration of the vehicle) the effect utilized in the tire pressure monitoring system with indirect measurement is frequently so insignificant that pressure loss can only be detected safely by a tire pressure monitoring system with direct measurement. In the non-driven axle, however, a tire pressure monitoring system with indirect measurement is appropriate to safely detect tire pressure loss. Each tire pressure sensor has a transmitting unit and a receiving unit fitted to the vehicle to supply information about the pressure value of the tire to an evaluating unit. This renders position detection possible, i.e. the allocation of the individual wheels to their installation positions (left front wheel, right front wheel, etc.). The influence of different coefficients of friction μ between tires and roadway has an effect on the driving wheels only because a rotational speed difference exists between a wheel at a high coefficient of friction $\mu_{high}$ and a wheel at a low coefficient of friction $\mu_{low}$ due to the torque applied to a driving wheel. Therefore, the tire pressure monitoring device described herein is able to safely and quickly detect an insignificant pressure loss even under so-called μ-split conditions (the wheels of the driven axle adopt different coefficients of friction). Different coefficients of friction may e.g. imply a high coefficient of friction $\mu_{high}$ on dry asphalt and a low coefficient of friction Plow on an icy roadway. The non-driven wheels, however, do not depend on the coefficients of friction in terms of their rotational behavior. The result is that even insignificant tire pressure losses are safely and quickly detected by means of relatively low detection thresholds, in contrast to the relatively high detection thresholds in a conventional indirect tire pressure monitoring system according to the state of the art.

In contrast to the first embodiment, a central receiving unit for all transmitting units of the tire pressure sensors is used in a second embodiment. Position detection is also enabled thereby when the receiving unit is arranged in such a fashion, e.g. By being positioned more closely to a transmitting unit, that the wheels are allocated to their installation positions by way of the different field intensities of the transmitting units.

In a third embodiment, another wheel speed sensor is additionally used on the driving axle on a wheel of the driven axle or directly on the driven axle e.g. on the differential. This provision allows detecting a simultaneous pressure loss on both wheels of the non-driven axle, or a simultaneous pressure loss on all wheels. Position detection is herein possible as well by using the arrangement of the receiving unit(s) as described in the first and second embodiments.

In a fourth embodiment, the first embodiment described is supplemented to such effect that wheel speed sensors are employed on all wheels. Likewise in this embodiment, position detection is possible by using the arrangement of the receiving unit(s) described in the first and second embodiments. Further, this embodiment is favorable in that a fallback level detecting pressure loss on the individual tires exists due to the tire pressure monitoring system with indirect measurement even upon failure of the tire pressure monitoring system with direct measurement.

In a fifth embodiment, a tire pressure sensor is employed on a wheel on the non-driven axle in addition to the first embodiment. This provision allows detecting pressure loss more quickly.

The employment of driving dynamics sensors such as yaw rate sensor or lateral acceleration sensor allows further improving the above-mentioned embodiments because e.g. a cornering maneuver is safely detected by the driving dynamics sensors so that the monitoring times of the tire pressure monitoring system with indirect measurement are shortened.

The methods of monitoring the tire pressure are explained in the following by way of the above-mentioned embodiments. As a starting point, a vehicle with a driven front axle is examined, while the method of the invention is not limited to vehicles with a driven front axle. The wheels VL (left front) and VR (right front) are directly monitored by wheel pressure sensors. The wheels HL (left rear) and HR (right rear) are monitored by wheel speed sensors. The wheels HR (left rear) and HR (right rear) are monitored by wheel speed sensors. The wheel speed sensors measure the wheel speeds of the individual wheels HL and HR, the said wheel speeds being composed of the wheel rolling circumferences and the wheel revolution times T for a wheel rotation. Each wheel HL and HR has an individual wheel revolution time ($T_{HL}$, $T_{HR}$).

According to the first embodiment, the tire pressure monitoring system with indirect measurement, after actuation of a reset button, learns a reference value $X1_{ref}$ on the basis of the two wheel speed sensors on the non-driven axle. This reference value $X1_{ref}$ is mainly based on a difference between the two wheel revolution times $T_{HL}$ and $T_{HR}$ of the wheels HL and HR under review, and the difference is divided by the sum of the two wheel revolution times $T_{HL}$ and $T_{HR}$. The reference value $X1_{ref}$ is determined in consideration of difference vehicle speeds and in consideration of cornering maneuvers. After completion of this learning phase, a current comparison value $X1_{current}$ is constantly determined from the same wheel revolution times $T_{HL}$ and $T_{HR}$ according to the method described hereinabove. A difference is produced from the comparison value $X1_{current}$ and the reference value $X1_{ref}$. This difference is compared with a threshold value S previously determined from the reference value $X1_{ref}$ or a threshold value –S, respectively. When this difference exceeds the threshold value S, or is lower than the threshold value –S, respectively, pressure loss on one of the wheels HL and HR can be precisely allocated to the respective wheel HL or HR. In this respect, it is important that the difference between the comparison value $X1_{current}$ and the reference value $X1_{ref}$ is produced only in the same driving situation, e.g. at the same vehicle speed and when straight travel is detected. In vehicles equipped with an electronic stability program (ESP), it is easily possible to evaluate the data of a yaw rate sensor or lateral acceleration sensor to procure information about a cornering maneuver.

According to the third embodiment, the tire pressure monitoring system with indirect measurement learns different reference values $X1_{ref}$ and $X2_{ref}$ by way of an additional wheel speed sensor, e.g. on the wheel VL of the driven axle. The reference value $X1_{ref}$ is determined like in the previous embodiment. The reference value $X2_{ref}$ is basically composed of the difference between the two wheel revolution times $T_{HL}$ and $T_{VL}$, with the difference being divided by the sum of the wheel revolution times $T_{HL}$ and $T_{VL}$. The reference value $X2_{ref}$ is learnt in different driving situations like the reference value $X1_{ref}$. It does not matter in this arrangement, on which wheel of the driven axle the additional wheel speed sensor is arranged. The wheel speed sensor can also be arranged on the differential of the driven axle. The wheel speed sensor can also be arranged on the differential of the driven axle. This additional wheel speed sensor allows detecting stealthy pressure loss on the non-driven axle. Monitoring the non-driven axle takes place similar to the first embodiment. Only if a tire pressure sensor detects a pressure difference on the driven axle will a current comparison value $X2_{current}$ be produced corresponding to the reference value $X2_{ref}$ in consideration of the same driving situations. A difference between the current comparison value $X2_{current}$ and the reference value $X2_{ref}$ is produced. This difference is compared to a previously defined threshold value S1. If this difference is lower than the threshold value S1, there is a stealthy pressure loss on both wheels of the non-driven axle.

A complete indirect tire pressure monitoring system as described hereinabove prevails according to the fourth embodiment. This increases the fail-safety of the system further because a system according to one of the abovementioned embodiments prevails upon failure of one or more of the wheel speed sensors. The non-driven axle is monitored in this arrangement like in the first embodiment. The driven axle is monitored similar to the non-driven axle. Stealthy pressure loss on a vehicle axle can be detected in addition by the method described in the third embodiment.

The other embodiments are not described in detail herein because the additional use of a tire pressure sensor with direct measurement achieves an obvious improvement in accuracy as the tire pressure value is directly provided. The mentioned embodiments are considerably improved in terms of shorter monitoring times or cornering detection by the additional use of further driving dynamics sensors, as has been described hereinabove.

The invention claimed is:

1. A tire pressure monitoring device for a motor vehicle, the device comprising:
   a direct measurement tire pressure monitoring system including a transmission device for transmitting tire pressure values determined by pressure sensors, the direct measurement tire pressure monitoring system includes a tire pressure measuring device for measuring a tire pressure value only on each wheel of a driven vehicle axle and on at most one wheel of a non-driven axle; and
   an indirect tire pressure monitoring system that operates utilizing wheel speed sensors, the indirect tire pressure monitoring system includes at least one wheel speed sensor on a non-driven vehicle axle.

2. The tire pressure monitoring device according to claim 1, wherein the transmission device comprises a transmitting and receiving unit which allows wireless transmission of the tire pressure values.

3. The tire pressure monitoring device according to claim 2 further comprising a single central reception antenna that is connected to the receiving unit and is allocated to all transmitting units of the individual tire pressure measuring devices.

4. The tire pressure monitoring device according to claim 3, wherein a reception antenna is arranged in direct vicinity of a respective transmitting unit and is allocated to each transmitting unit of a tire pressure measuring device, and each individual antenna is connected to the receiving unit.

5. The tire pressure monitoring device according to claim 4, wherein the indirect tire pressure monitoring system includes an additional wheel speed sensor on the driven axle or on a wheel of the driven axle.

6. The tire pressure monitoring device according to claim 4, wherein the indirect tire pressure monitoring system includes wheel speed sensors on all vehicle wheels.

7. The tire pressure monitoring device according to claim 6, wherein the evaluating unit is provided with information about the yaw rate or the lateral acceleration of the vehicle by way of at least one additional driving dynamics sensor.

8. A method of monitoring tire pressure for a tire pressure monitoring device including a direct tire pressure monitoring system and an indirect tire pressure monitoring system, the method comprising:
   determining tire pressure values;
   starting a learning mode for determining reference values from wheel speed values of the indirect tire pressure monitoring system;
   determining threshold values for a tire pressure loss from the determined reference values;
   establishing current comparison values from the wheel speed values of the indirect tire pressure monitoring; and
   evaluating a difference between the established current comparison value, the reference value and the tire pressure values in consideration of detection thresholds with respect to tire pressure loss.

9. The method of monitoring the tire pressure according to claim 8, wherein the indirect tire pressure monitoring system processes only wheel speed information of non-driven wheels for establishing the tire pressure values or corresponding characteristic quantities.

10. The method of monitoring the tire pressure according to claim 9, wherein the current comparison values and the reference values comprise a quotient, and a counter thereof is produced from a difference or a sum of two characteristic quantities of the non-driven axle that describe the wheel rotational speed, and with the denominator being produced at least from a standardized quantity which is at least one of;
    determined with characteristic quantities of the non-driven axle; and
    determined with a characteristic quantity of the driven axle.

11. The method of monitoring the tire pressure according to claim 8, wherein the learning mode is started by actuating a reset button.

12. A computer program product for a tire pressure monitoring device including a direct tire pressure monitoring system and an indirect tire pressure monitoring system, the computer program product comprising:
    code for determining tire pressure values;
    code for starting a learning mode for determining reference values from wheel speed values of the indirect tire pressure monitoring system;
    code fordetermining threshold values for a tire pressure loss from the determined reference values;
    code for establishing current comparison values from the wheel speed values of the indirect tire pressure monitoring; and
    code for evaluating a difference between the established current comparison value, the reference value and the tire pressure values in consideration of detection thresholds with respect to tire pressure loss.

* * * * *